(12) United States Patent
Hasegawa et al.

(10) Patent No.: US 10,763,550 B2
(45) Date of Patent: Sep. 1, 2020

(54) STACKED ALL-SOLID-STATE BATTERY AND METHOD OF MANUFACTURING THE SAME

(71) Applicant: Panasonic Intellectual Property Management Co., Ltd., Osaka (JP)

(72) Inventors: Kenta Hasegawa, Osaka (JP); Takao Kuromiya, Osaka (JP)

(73) Assignee: PANASONIC INTELLECTUAL PROPRETY MANAGEMENT CO., LTD., Osaka (JP)

( * ) Notice: Subject to any disclaimer, the term of this patent is extended or adjusted under 35 U.S.C. 154(b) by 338 days.

(21) Appl. No.: 15/885,824

(22) Filed: Feb. 1, 2018

(65) Prior Publication Data

US 2018/0287209 A1  Oct. 4, 2018

(30) Foreign Application Priority Data

Apr. 4, 2017  (JP) .................................. 2017-074652

(51) Int. Cl.
*H01M 10/0585* (2010.01)
*H01M 2/10* (2006.01)
(Continued)

(52) U.S. Cl.
CPC ..... *H01M 10/0585* (2013.01); *H01M 2/1061* (2013.01); *H01M 2/1077* (2013.01);
(Continued)

(58) Field of Classification Search
CPC ......... H01M 10/0585; H01M 10/0413; H01M 10/0525; H01M 10/0562; H01M 2/1061; H01M 2/1077; H01M 4/525
See application file for complete search history.

(56) References Cited

U.S. PATENT DOCUMENTS

| 2007/0212604 A1 | 9/2007 | Ovshinsky et al. |
| 2009/0061297 A1 | 3/2009 | Kimura |
| 2018/0277858 A1* | 9/2018 | Fujita .................. H01M 8/2483 |

FOREIGN PATENT DOCUMENTS

| JP | 2007-273350 | 10/2007 |
| JP | 2008-103285 | 5/2008 |

(Continued)

*Primary Examiner* — Jimmy Vo
(74) *Attorney, Agent, or Firm* — Wenderoth, Lind & Ponack, L.L.P.

(57) ABSTRACT

Provided is a stacked all-solid-state battery including a plurality of all-solid-state batteries, each all-solid-state battery including a cathode layer that has a cathode current collector and a cathode active material layer containing a cathode active material and formed on the cathode current collector, an anode layer that has an anode current collector and an anode active material layer containing an anode active material and formed on the anode current collector, and a solid electrolyte layer disposed between the cathode active material layer and the anode active material layer and containing a solid electrolyte having a lithium ion conductivity. The plurality of all-solid-state batteries are stacked, and the plurality of all-solid-state batteries include two adjacent all-solid-state batteries, the two all-solid-state batteries being configured such that the cathode current collector of one all-solid-state battery is directly joined to the anode current collector of the other all-solid-state battery.

4 Claims, 3 Drawing Sheets

(51) Int. Cl.
*H01M 10/0525* (2010.01)
*H01M 10/04* (2006.01)
H01M 4/525 (2010.01)
H01M 10/0562 (2010.01)

(52) U.S. Cl.
CPC ... *H01M 10/0413* (2013.01); *H01M 10/0525* (2013.01); *H01M 4/525* (2013.01); *H01M 10/0562* (2013.01); *H01M 2220/20* (2013.01); *H01M 2300/0065* (2013.01); *H01M 2300/0068* (2013.01); *Y02E 60/122* (2013.01)

(56) References Cited

FOREIGN PATENT DOCUMENTS

| | | |
|---|---|---|
| JP | 2011-108469 | 6/2011 |
| JP | 2011-204510 | 10/2011 |
| WO | WO-2017208570 A1 * 12/2017 | .......... H01M 8/0273 |

* cited by examiner

STACKED ALL-SOLID-STATE BATTERY AND METHOD OF MANUFACTURING THE SAME

BACKGROUND

1. Technical Field

The present disclosure relates to a stacked all-solid-state battery obtained by stacking a plurality of all-solid-state batteries on each other in series, in each of which a cathode layer, a solid electrolyte layer, and an anode layer are sequentially disposed, and a method of manufacturing the same.

2. Description of Related Art

Recently, development of repeatedly usable secondary batteries has been required due to weight reduction and cordlessness of electronic devices such as personal computers and mobile phones. Also in the field of automobiles such as electric vehicles and hybrid vehicles, development of a secondary battery having a high capacity is regarded as important, and the demand for a lithium ion battery having characteristics such as light weight, high voltage, and high energy density is on the increase.

Currently, widely used lithium ion batteries use an electrolytic solution containing a flammable organic solvent. Thus, it is required to mount a safety device for suppressing temperature rise at the time of short circuit or to provide a material, structure, or system for securing safety such as short circuit prevention. On the contrary, an all-solid-state battery obtained by changing a liquid electrolyte (electrolytic solution) to a solid electrolyte does not use a flammable organic solvent in the battery. Thus, it is considered that the all-solid-state battery is capable of simplifying the safety device, reducing manufacturing costs, and improving productivity.

In a lithium ion battery using an electrolytic solution, battery performances (for example, charging and discharging characteristics) may rapidly deteriorate due to freezing or increased viscosity of the electrolytic solution in a low temperature environment. On the other hand, in a lithium ion battery (hereinafter referred to as an "all-solid-state battery") using a solid electrolyte, since all constituent materials thereof are solid, it is considered that freezing of an electrolytic solution or the like hardly occurs in a low temperature environment unlike a lithium ion battery using an electrolytic solution. Therefore, deterioration of battery performances (for example, charging and discharging characteristics) is considered to depend only on temperature, and thus the battery performances hardly deteriorate.

In addition, in a lithium ion battery using an electrolytic solution, decomposition of the electrolytic solution may occur during charging and discharging, and ions other than lithium ions may also move. Reaction of ions generated by decomposition may result in side reactions such as thinly deposited ions at an interface between an electrode and an electrolyte, thereby causing its cycle life to be shorter than that of an all-solid-state battery. On the other hand, in an all-solid-state battery, ions other than lithium ions hardly move during charging and discharging, and side reactions hardly occur. Thus, its cycle life is longer than that of a lithium ion battery using an electrolytic solution. From the above, an all-solid-state battery has recently attracted attention.

In the field of such an all-solid-state battery, a stacked all-solid-state battery in which a plurality of all-solid-state batteries are stacked has been developed. For example, Japanese Patent Unexamined Publication No. 2008-103285 discloses a bipolar all-solid-state battery in which a cathode layer is disposed on one surface of a current collector and an anode layer is disposed on the other surface. Japanese Patent Unexamined Publication No. 2011-204510 discloses an all-solid-state lithium ion secondary battery obtained by connecting a plurality of power generation elements to each other in series, in each of which a cathode layer, a solid electrolyte layer, and an anode layer are sequentially stacked. In the all-solid-state lithium ion secondary battery, the cathode of one power generation element and the anode of the other power generation element are bonded to each other with a conductive adhesive having no ion conductivity, in which the two power generation elements are adjacent to each other in a stacking direction. Japanese Patent Unexamined Publication No. 2011-108469 discloses a current collector including a pair of current collecting foils, in which a portion of one current collecting foil of the pair of current collecting foils is melted and joined to a recessed portion of the other current collecting foil.

SUMMARY

In one embodiment of a stacked all-solid-state battery according to the present disclosure, there are provided a plurality of all-solid-state batteries, each of the all-solid-state batteries including a cathode layer that has a cathode current collector and a cathode active material layer containing at least a cathode active material and formed on the cathode current collector, an anode layer that has an anode current collector and an anode active material layer containing at least an anode active material and formed on the anode current collector, and a solid electrolyte layer disposed between the cathode active material layer and the anode active material layer and containing a solid electrolyte having at least a lithium ion conductivity. The plurality of all-solid-state batteries are stacked, and the plurality of all-solid-state batteries include two adjacent all-solid-state batteries, the two adjacent all-solid-state batteries being configured such that the cathode current collector of one of the two adjacent all-solid-state batteries is directly joined to the anode current collector of the other one of the two adjacent all-solid-state batteries, and voids are present at the interface between the one all-solid-state battery and the other all-solid-state battery.

In addition, in one embodiment of a method of manufacturing the stacked all-solid-state battery according to the present disclosure, the method includes: preparing a plurality of all-solid-state batteries, each of the all-solid-state batteries including a cathode layer that has a cathode current collector and a cathode active material layer containing at least a cathode active material and formed on the cathode current collector, an anode layer that has an anode current collector and an anode active material layer containing at least an anode active material and formed on the anode current collector, and a solid electrolyte layer disposed between the cathode active material layer and the anode active material layer and containing a solid electrolyte having at least a lithium ion conductivity; and stacking the plurality of all-solid-state batteries. The plurality of all-solid-state batteries include two adjacent all-solid-state batteries. In the stacking, the plurality of all-solid-state batteries are stacked such that the cathode current collector of one of the two adjacent all-solid-state batteries is directly joined to the anode current collector of the other one of the two adjacent all-solid-state batteries and voids are present at the interface between the one all-solid-state battery and the other all-solid-state battery.

According to the present disclosure, there are provided a stacked all-solid-state battery having high battery performances (for example, output characteristics and cycle life characteristics) and a method of manufacturing the same.

DETAILED DESCRIPTIONS

Figure 1:
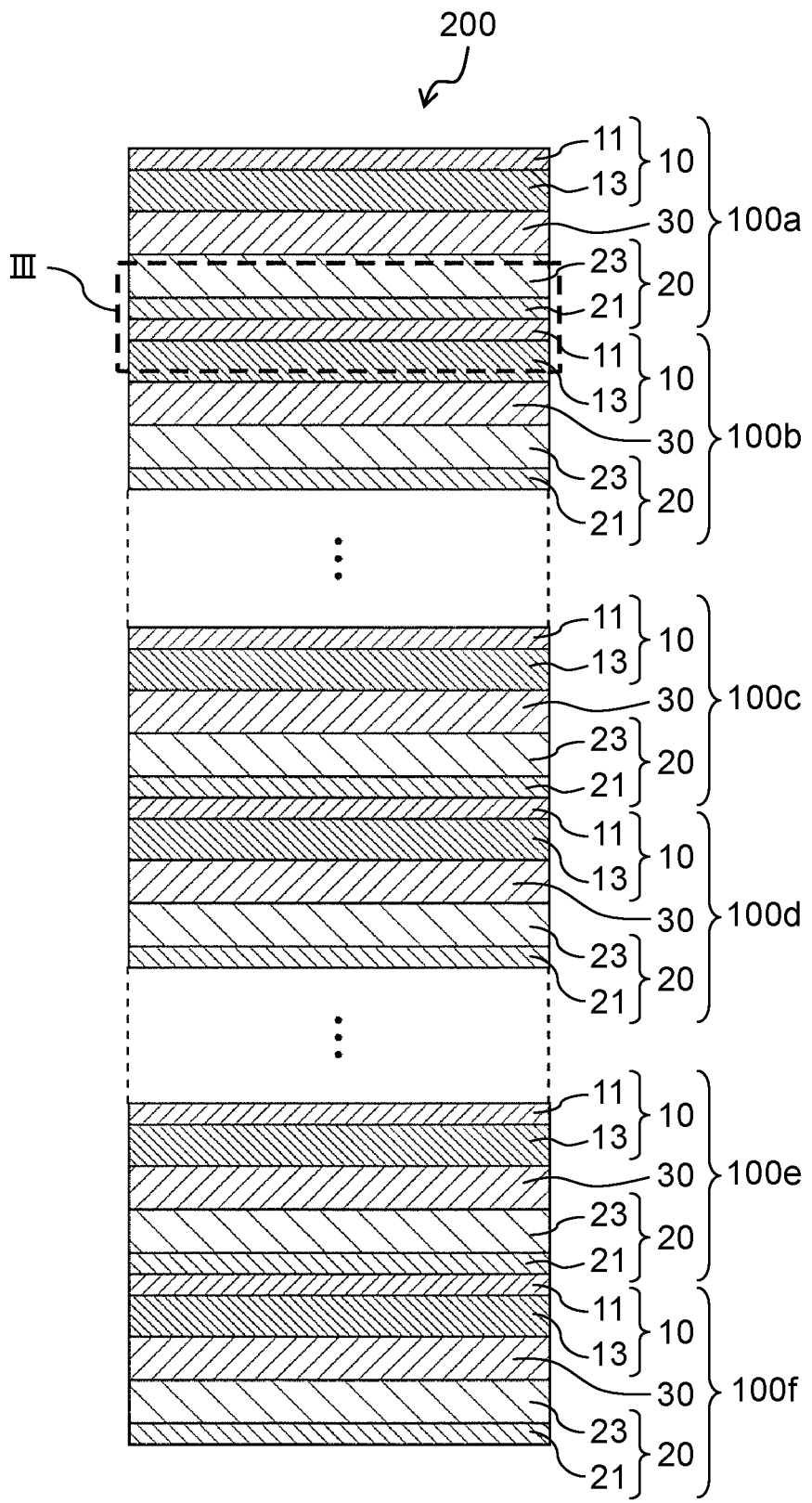
FIG. 1 is a schematic sectional view showing a stacked all-solid-state battery according to the embodiment.

The present inventors have found that the following problems arise with respect to the stacked all-solid-state batteries described in the "Description of Related Art" section.

A solid electrolyte can be largely divided into an organic solid electrolyte and an inorganic solid electrolyte. The organic solid electrolyte has an ion conductance of about $10^{-6}$ S/cm at 25° C. which is extremely low compared to $10^{-3}$ S/cm of an electrolytic solution. Therefore, it is difficult to operate an all-solid-state battery using an organic solid electrolyte in an environment at 25° C. As the inorganic solid electrolyte, there are an oxide-based solid electrolyte and a sulfide-based solid electrolyte. Ion conductances thereof are $10^{-4}$ to $10^{-3}$ S/cm. The oxide-based solid electrolyte has a high grain boundary resistance. As means for lowering the grain boundary resistance, sintering or thinning of powders has been studied. However, in the case of sintering, since treatments are made at a high temperature, constituent elements of the cathode or the anode and the constituent elements of the solid electrolyte mutually diffuse. This makes it difficult to obtain good charging and discharging characteristics. Therefore, studies on thinning of an all-solid-state battery using an oxide-based solid electrolyte are mainstream. However, for a thin film type all-solid-state battery, it is difficult to increase the size of the battery, and thus it is unsuitable for achieving a high capacity.

On the other hand, the sulfide-based solid electrolyte has a smaller grain boundary resistance than the oxide-based solid electrolyte. Thus, favorable characteristics can be obtained only by compression molding of powders without using a sintering process. In the development of an all-solid-state battery for further increase in size and capacity, researches on a coating-type all-solid-state battery using a sulfide-based solid electrolyte and capable of being increased in size have been actively conducted in recent years.

The coating-type all-solid-state battery includes a cathode layer containing at least a cathode active material on a current collector that is made of a metal foil and an anode layer containing at least an anode active material on a current collector that is made of a metal foil, with a solid electrolyte layer containing a solid electrolyte layer having at least an ion conductivity disposed therebetween.

As described above, in the bipolar all-solid-state battery disclosed in Japanese Patent Unexamined Publication No. 2008-103285, the cathode layer and the anode layer are disposed on both sides of one current collector. Thus, even in a case where multiple batteries are connected to each other in series, it is not necessary to connect the battery cells to each other with an intermediate terminal or the like. Therefore, the resistance of the entire battery is smaller than that of a battery in which battery cells are connected to each other with an intermediate terminal or the like, and thus a high output can be obtained. However, it is necessary to thicken the current collector in order to prevent a short circuit. Thus, there is a problem that a volumetric energy density of the current collector decreases, thereby resulting in deterioration of battery performances (for example, output characteristics).

The stacked all-solid-state battery disclosed in Japanese Patent Unexamined Publication No. 2011-204510 uses an adhesive. Thus, the adhesive strength between the battery cells is strong. However, there is a problem that the adhesive exhibits a high resistance, thereby resulting in deterioration of battery performances (for example, output characteristics).

In the current collector disclosed in Japanese Patent Unexamined Publication No. 2011-108469, the current collectors are welded to each other, and thus the adhesion between the current collectors is strong. However, voids are reduced at the interface between the current collectors, thereby not allowing absorption of volume change in the cathode active material and the anode active material during charging and discharging. Thus, there is a problem that battery characteristics (for example, cycle life characteristics) deteriorate. It is an object of the present disclosure to provide a stacked all-solid-state battery having high battery performances (for example, output characteristics and cycle life characteristics) and a method of manufacturing the same.

Hereinafter, stacked all-solid-state batteries according to embodiments of the present disclosure will be described with reference to the drawings. Any of the following embodiments illustrates one specific example of the present disclosure. Numerical values, shapes, materials, constituent elements, disposition positions and connection forms of the constituent elements, and the like are merely an example, and are not intended to limit the present disclosure. In addition, among the constituent elements in the following embodiments, the constituent element not described in the independent claims showing the highest-level concept of the present disclosure is described as an optional constituent element.

In addition, each drawing is a schematic view and is not necessarily shown precisely. In each drawing, substantially the same configuration is designated by the same reference numeral, and redundant description may be omitted or simplified in some cases.

EMBODIMENTS

Hereinafter, a stacked all-solid-state battery according to the present embodiment and an all-solid-state battery constituting the stacked all-solid-state battery will be described in detail with reference to the drawings.

A. Stacked all-Solid-State Battery

Figure 2A:
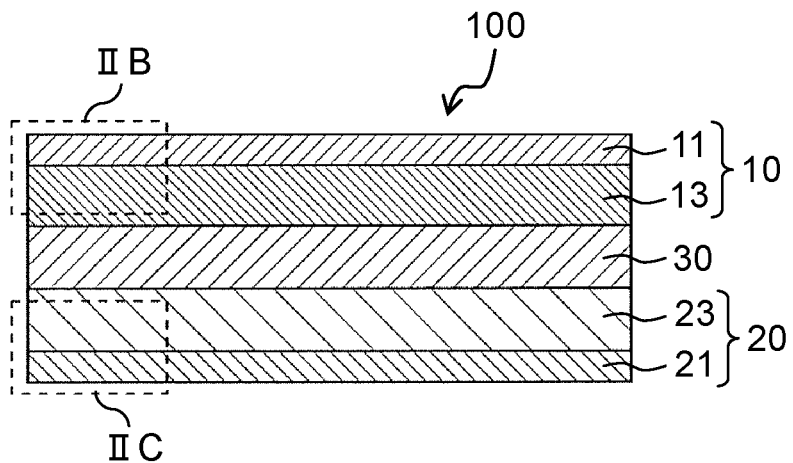
FIG. 2A is a schematic sectional view showing an all-solid-state battery according to the embodiment.
Figure 2B:
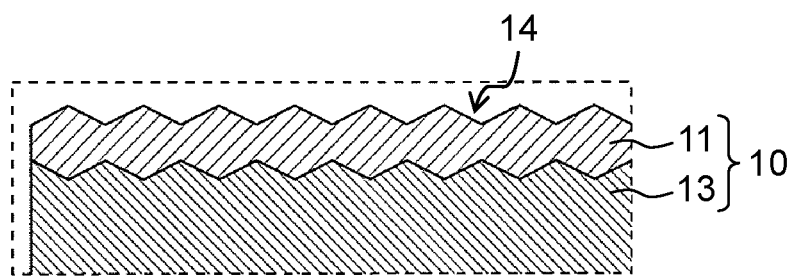
FIG. 2B is a view enlarging a part of the schematic sectional view of the all-solid-state battery shown in FIG. 2A.
Figure 2C:
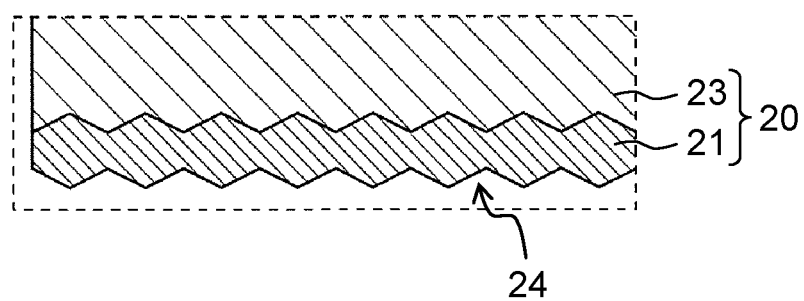
FIG. 2C is a view enlarging a part of the schematic sectional view of the all-solid-state battery shown in FIG. 2A.
Figure 3A:
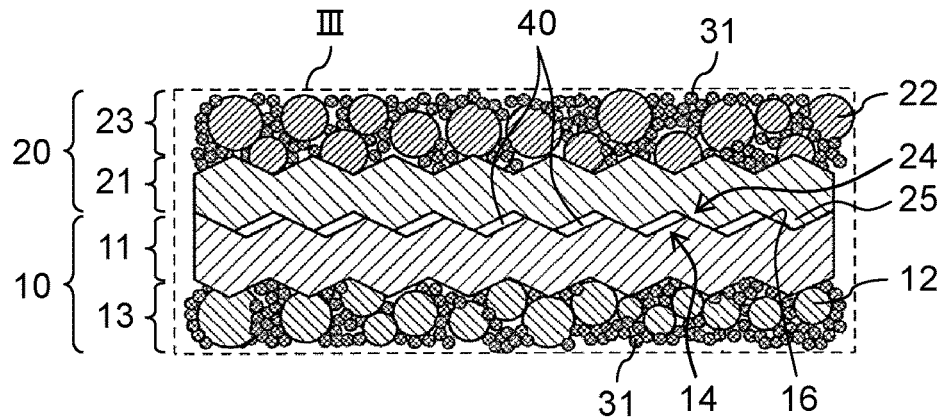
FIG. 3A is a first sectional view enlarging a part of the schematic sectional view of the stacked all-solid-state battery shown in FIG. 1.
Figure 3B:
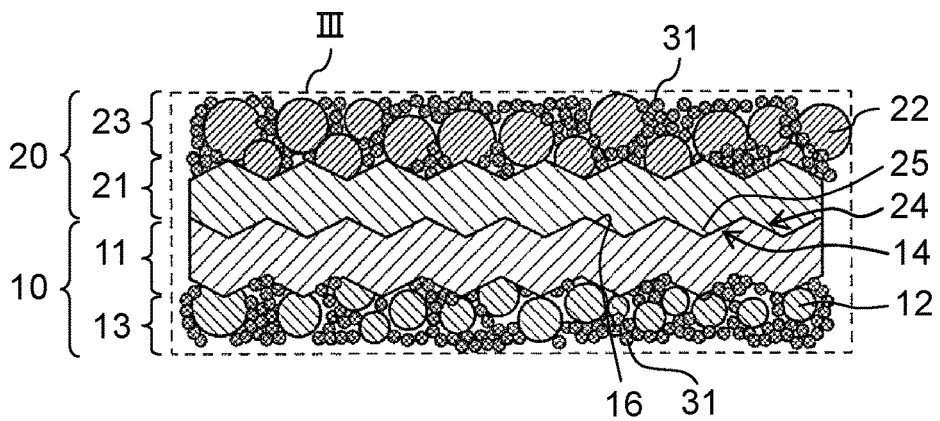
FIG. 3B is a second sectional view enlarging a part of the schematic sectional view of the stacked all-solid-state battery shown in FIG. 1
Figure 3C:
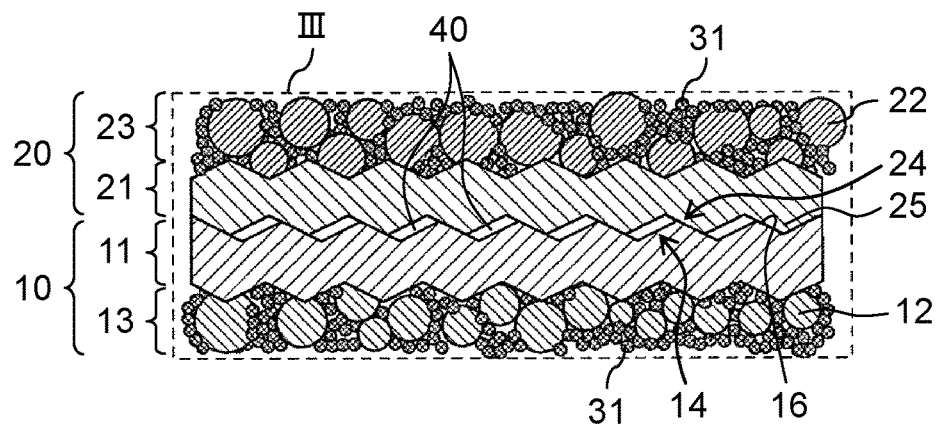
FIG. 3C is a third sectional view enlarging a part of the schematic sectional view of the stacked all-solid-state battery shown in FIG. 1

A stacked all-solid-state battery according to the present embodiment will be described with reference to FIGS. 1 to 3C. FIG. 1 is a schematic sectional view of stacked all-solid-state battery 200 according to the present embodiment. FIG. 2A is a schematic sectional view of all-solid-state battery 100 according to the present embodiment. FIG. 2B is a view enlarging a part (region IIB) of a schematic sectional view of all-solid-state battery 100 shown in FIG. 2A. FIG. 2C is a view enlarging a part (region IIC) of a schematic sectional view of all-solid-state battery 100 shown in FIG. 2A. FIG. 3A is a first sectional view enlarging a part of a schematic sectional view of stacked all-solid-state battery 200 shown in FIG. 1. FIG. 3B is a second sectional view enlarging a part of a schematic sectional view of stacked all-solid-state battery 200 shown in FIG. 1. FIG. 3C is a third sectional view enlarging a part of a schematic sectional view of stacked all-solid-state battery 200 shown in FIG. 1.

As shown in FIG. 1, in stacked all-solid-state battery 200 according to the present embodiment, a plurality of all-solid-state batteries 100 are stacked to each other, each all-solid-state battery 100 including cathode layer that has cathode current collector 11 and cathode active material layer 13 containing at least cathode active material 12 and formed on cathode current collector 11, anode layer 20 that has anode current collector 21 and anode active material layer 23 containing at least anode active material 22 and formed on anode current collector 21, and solid electrolyte layer 30 disposed between cathode active material layer 13 and anode active material layer 23 and containing solid electrolyte 31 having at least a lithium ion conductivity.

Further, as shown in FIG. 3A, in stacked all-solid-state battery 200, for example, two adjacent all-solid-state batteries 100a and 100b of the plurality of all-solid-state batteries 100a to 100f are configured such that cathode current collector 11 of one all-solid-state battery 100b is directly joined to anode current collector 21 of the other all-solid-state battery 100a and voids 40 are present at the interface between cathode current collector 11 of one all-solid-state battery 100b and anode current collector 21 of the other all-solid-state battery 100a. Likewise for two adjacent all-solid-state batteries 100c and 100d, and 100e and 100f, cathode current collector 11 is directly joined to anode current collector 21, and a plurality of joining interfaces (hereinafter, the joining interface is referred to as simply an "interface" in some cases) are formed in stacked all-solid-state battery 200.

As such, in stacked all-solid-state battery 200 according to the present embodiment, presence of voids 40 at a joining interface between one all-solid-state battery 100a and the other all-solid-state battery 100b of two adjacent all-solid-state batteries 100a and 100b allows voids 40 to absorb the expansion of anode active material 22 during charging. Thus, peeling of all-solid-state batteries 100a and 100b at the interface can be suppressed. Further, as shown in FIG. 3B, a contact area between cathode current collector 11 and anode current collector 21 increases. Thus, a thermal conductivity between cathode current collector 11 and anode current collector 21 increases, thereby allowing efficient radiation of heat generated in all-solid-state battery 100. Therefore, cycle life characteristics of stacked all-solid-state battery 200 can be further improved.

On the other hand, anode active material 22 contracts during discharging. Thus, volume change of anode active material 22 also leads to a decreased volume of anode active material layer 23. As a result, as shown in FIG. 3C, voids 40 at the interface between cathode current collector 11 and anode current collector 21 increase. In a case where voids 40 increase, an air layer increases, and thus heat insulating properties of stacked all-solid-state battery 200 increases. Therefore, temperature lowering of stacked all-solid-state battery 200 can be suppressed in a low temperature environment at 0° C. or lower, or the like. Consequently, it is possible to improve battery characteristics (for example, charging and discharging characteristics) in a low temperature environment.

As shown in FIGS. 1 to 3C, in stacked all-solid-state battery 200 according to the present embodiment, cathode current collectors 11 and anode current collectors 21 of the plurality of all-solid-state batteries 100a to 100f include a plurality of uneven portions 14 and 24, respectively, on surfaces perpendicular to a stacking direction. In the plurality of all-solid-state batteries 100a to 100f, for example, the two adjacent all-solid-state batteries (for example, all-solid-state batteries 100a and 100b) are configured such that the plurality of uneven portions 14 of cathode current collector 11 of one all-solid-state battery 100b are at least partially engaged with the plurality of uneven portions 24 of anode current collector 21 of the other adjacent all-solid-state battery 100a. The at least partial engagement, for example, means that as shown in FIG. 3A, recessed portions 16 of the plurality of uneven portions 14 of cathode current collector 11 of one all-solid-state battery 100b are engaged with protruded portions 25 of the plurality of uneven portions 24 of anode current collector 21 of the other all-solid-state battery 100a. Thus, cathode current collector 11 has the plurality of uneven portions 14 and anode current collector 21 has the plurality of uneven portions 24, thereby resulting in an increased contact area between cathode current collector 11 of one all-solid-state battery 100b and anode current collector 21 of the other all-solid-state battery 100a, with the two batteries being adjacent to each other in a stacking direction, and an improved electron conductivity at the interface. In addition, since the plurality of uneven portions 14 of cathode current collector 11 are at least partially engaged with the plurality of uneven portions 24 of anode current collector 21 that is joined to cathode current collector 11, an electrical connection between all-solid-state batteries 100a and 100b being adjacent to each other can be maintained without reduction.

Cathode current collector 11, anode current collector 21, and the plurality of uneven portions 14 and 24 will be described later, and thus the description therefor is omitted here.

In stacked all-solid-state battery 200 according to the present embodiment, in a case where charging and discharging are repeated, for example, all-solid-state batteries 100a and 100f at both end portions in a stacking direction are easily radiated. As a result, an internal temperature of all-solid-state batteries 100a and 100f hardly increases, and thus deterioration of all-solid-state batteries 100a and 100f due to heat can be suppressed. Therefore, the cycle life of all-solid-state batteries 100a and 100f disposed at both end portions in a stacking direction of stacked all-solid-state battery 200 is prolonged. On the other hand, for example, all-solid-state batteries 100c and 100d at the central portion in the stacking direction hardly radiate heat. As a result, an internal temperature of all-solid-state batteries 100c and 100d easily increases, and thus it is difficult to suppress deterioration of all-solid-state batteries 100c and 100d due to heat. Therefore, the cycle life of all-solid-state batteries 100c and 100d disposed at the central portion in the stacking direction of stacked all-solid-state battery 200 is shortened.

In addition, for example, in a case where stacked all-solid-state battery 200 is used in a low temperature environment at 0° C. or lower, or the like, all-solid-state batteries 100a and 100f at both end portions in the stacking direction are easily affected by an ambient temperature, and thus the cycle life thereof is shortened. On the other hand, for example, all-solid-state batteries 100c and 100d at the central portion in the stacking direction are hardly affected by an ambient temperature in a low temperature environment, and thus the cycle life thereof is prolonged.

Accordingly, in stacked all-solid-state battery 200, the respective cycle lives of all-solid-state batteries 100a to 100f vary depending on disposition positions in the stacking direction.

Generally, in the stacked all-solid-state battery, there is a problem that in a case where any one of the all-solid-state batteries constituting the stacked all-solid-state battery deteriorates and becomes unusable, the stacked all-solid-state battery also becomes unusable.

Meanwhile, in the stacked all-solid-state battery 200 according to the present embodiment, two adjacent all-solid-state batteries 100c and 100d of the plurality of all-solid-state batteries are configured such that cathode current collector 11 of one all-solid-state battery 100d is directly joined to anode current collector 21 of the other all-solid-state battery 100c and voids 40 are present at the interface between cathode current collector 11 of one all-solid-state battery 100d and anode current collector 21 of the other all-solid-state battery 100c. As such, presence of voids 40 at the interface between cathode current collector 11 of one all-solid-state battery 100d and anode current collector 21 of the other all-solid-state battery 100c results in an excellent releasability of all-solid-state batteries 100c and 100d at the interface, thereby allowing only a deteriorated all-solid-state battery (for example, all-solid-state battery 100c) to be removed from stacked all-solid-state battery 200. Therefore, it becomes possible to easily replace deteriorated all-solid-state battery 100c with new all-solid-state battery 100. As such, among the plurality of all-solid-state batteries 100a to 100f constituting stacked all-solid-state battery 200, replacement of deteriorated all-solid-state battery 100c with new all-solid-state battery 100 allows stacked all-solid-state battery 200 to be used for a longer time than a case where deteriorated all-solid-state battery 100c is not replaced with new all-solid-state battery 100.

In stacked all-solid-state battery 200 according to the present embodiment, interfacial voids at the end portion in the stacking direction of stacked all-solid-state battery 200 may be smaller than interfacial voids at the central portion in the stacking direction of stacked all-solid-state battery 200. As described above, since all-solid-state batteries 100c and 100d disposed at the central portion in the stacking direction of stacked all-solid-state battery 200 hardly radiate heat, the internal temperature of the battery easily increases. Therefore, by making the interfacial voids at the end portion in the stacking direction of stacked all-solid-state battery 200 less than the interfacial voids at the central portion in the stacking direction, the heat radiation properties at the interface between all-solid-state batteries 100c and 100d can be improved, and deterioration of all-solid-state batteries 100c and 100d due to heat can be suppressed.

In this case, the interface at the end portion in the stacking direction of stacked all-solid-state battery 200 refers to an interface between cathode current collector 11 of one all-solid-state battery 100b and anode current collector 21 of the other all-solid-state battery 100a, the two all-solid-state batteries 100a and 100b being adjacent to each other and disposed at the end portion in the stacking direction. In addition, the interface at the central portion in the stacking direction of stacked all-solid-state battery 200 refers to an interface between cathode current collector 11 of one all-solid-state battery 100f and anode current collector 21 of the other all-solid-state battery 100e, the two all-solid-state batteries 100e and 100f being adjacent to each other and disposed at the central portion in the stacking direction.

In stacked all-solid-state battery 200 according to the present embodiment, voids 40 at the interface between two adjacent all-solid-state batteries 100a and 100b disposed at the end portion in the stacking direction, or voids 40 at the interface between two adjacent all-solid-state batteries 100e and 100f disposed at the end portion in the stacking direction are preferably less than or equal to 0.99 times and more preferably less than or equal to 0.9 times, with respect to voids 40 at the interface between two adjacent all-solid-state batteries 100c and 100d disposed at the central portion in the stacking direction.

In the present specification, voids 40 are a space (volume) not filled with necessary materials such as cathode active material 12 or anode active material 22, solid electrolyte 31, a binder, and a conductive assistant, and a large number of voids 40 means that a large amount of space (volume) is not filled.

When stacked all-solid-state battery 200 according to the present embodiment is bent, a large number of voids 40 may be present at the bent outermost or innermost interface, for example, the interface between two adjacent all-solid-state batteries 100a and 100b disposed at the end portion in the stacking direction or the interface between two adjacent all-solid-state batteries 100e and 100f disposed at the end portion in the stacking direction. Thus, in the bent outermost interface or innermost interface, since stress due to bending is easily absorbed, peeling at the interface hardly occurs. Therefore, it is possible to improve battery characteristics (for example, cycle life characteristics).

Hereinafter, states of the interface (as an example, the joining interface between two adjacent all-solid-state batteries 100a and 100b) before charging, after charging, and after discharging of stacked all-solid-state battery 200 according to the present embodiment will be described with reference to FIGS. 3A to 3C.

First, the state of the interface before charging (at normal time) of stacked all-solid-state battery 200 according to the present embodiment will be described. As shown in FIG. 3A, in two adjacent all-solid-state batteries 100a and 100b, cathode current collector 11 and anode current collector 21 include the plurality of uneven portions 14 and 24, respectively, on the surfaces perpendicular to the stacking direction, and the plurality of uneven portions 14 of cathode current collector 11 of one all-solid-state battery 100b are directly joined to the plurality of uneven portions 24 of anode current collector 21 of the other all-solid-state battery 100a. As a result, the contact area between cathode current collector 11 and anode current collector 21 which are joined to each other increases, and an electron conductivity at the joining interface is improved. Therefore, stacked all-solid-state battery 200 according to the present embodiment can have further improved output characteristics, compared to a stacked all-solid-state battery having no plurality of uneven portions 14 and 24 on the surfaces of cathode current collector 11 and anode current collector 21.

Next, the state of the interface after charging of stacked all-solid-state battery 200 according to the present embodiment will be described. As shown in FIG. 3B, since lithium ions are inserted into the crystal structure of anode active material 22 during charging, anode active material 22 expands, and thus its volume increases. During charging, anode active material 22 generates heat as it expands, and the generated heat is radiated through the anode current collector. In the present embodiment, voids 40 at the joining interface absorb the expansion of anode active material 22, which allows engagement of the plurality of uneven portions 14 of cathode current collector 11 of one adjacent all-solid-state battery 100b with the plurality of uneven portions 24 of anode current collector 21 of the other adjacent all-solid-state battery 100a, thereby causing them to function like a single current collector having no voids 40. As a result, a heat conduction path from anode current collector 21 is expanded, and thus heat radiation properties is improved. Therefore, it is possible to improve the battery characteristics (for example, cycle life characteristics) of the stacked all-solid-state battery 200.

Next, the state of the interface after discharging of stacked all-solid-state battery 200 according to the present embodiment will be described. As shown in FIG. 3C, since lithium ions are removed from anode active material 22 during discharging, anode active material 22 contracts, and thus its volume decreases. In stacked all-solid-state battery 200 according to the present embodiment, a volume of anode active material layer 23 decreases as anode active material 22 contracts, and thus voids 40 at the joining interface increase. As a result, since heat insulating properties is improved, for example, the temperature lowering of stacked all-solid-state battery 200 can be suppressed in a low temperature environment at 0° C. or lower, or the like. Therefore, it is possible to improve the battery characteristics (for example, charging and discharging characteristics) of stacked all-solid-state battery 200 in a low temperature environment.

In stacked all-solid-state battery 200 according to the present embodiment, the surface of cathode current collector 11 which faces the surface on the side adjacent to cathode active material layer 13 may have an arithmetic average roughness (Ra) of greater than or equal to 0.1 μm and less than or equal to 10 μm. Therefore, it is possible to directly join the two adjacent all-solid-state batteries (for example, all-solid-state batteries 100a and 100b) to each other while having an appropriate amount of voids 40 at the interface between two adjacent all-solid-state batteries 100a and 100b.

Further, in stacked all-solid-state battery 200 according to the present embodiment, the surface of anode current collector 21 which faces the surface on the side adjacent to anode active material layer 23 may have an arithmetic average roughness (Ra) of greater than or equal to 0.1 μm and less than or equal to 10 μm. Therefore, it is possible to directly join the two adjacent all-solid-state batteries (for example, all-solid-state batteries 100a and 100b) to each other while having an appropriate amount of voids 40 at the interface between two adjacent all-solid-state batteries 100a and 100b.

B. All-Solid-State Battery

The all-solid-state battery according to the present embodiment will be described with reference to FIGS. 2A to 2C. FIG. 2A is a schematic sectional view of all-solid-state battery 100 according to the present embodiment. FIGS. 2B and 2C are views enlarging a part of the schematic sectional view of all-solid-state battery 100 shown in FIG. 2A.

As shown in FIG. 2A, all-solid-state battery 100 according to the present embodiment, for example, includes cathode layer 10 that has cathode current collector 11 and cathode active material layer 13 containing at least cathode active material 12 and formed on cathode current collector 11, anode layer 20 that has anode current collector 21 and anode active material layer 23 containing at least anode active material 22 and formed on anode current collector 21, and solid electrolyte layer 30 disposed between cathode active material layer 13 and anode active material layer 23 and containing solid electrolyte 31 having at least a lithium ion conductivity.

As shown in FIG. 2B and FIG. 2C, in all-solid-state battery 100 according to the present embodiment, cathode current collector 11 and anode current collector 21 include the plurality of uneven portions 14 and 24, respectively, on the surfaces perpendicular to the stacking direction. This results in an increased contact area between cathode current collector 11 of one all-solid-state battery 100b and anode current collector 21 of the other all-solid-state battery 100a, with the two batteries being adjacent to each other in a stacking direction, and an improved electron conductivity at the interface. Cathode current collector 11 and anode current collector 21 will be described later, and thus the description therefor is omitted here.

Hereinafter, the surface of cathode current collector 11 on which cathode active material 12 is coated or the surface of anode current collector 21 on which anode active material 22 is coated is referred to as a coating surface, and the surface opposite to the coating surface is referred to as a rear surface.

B-1. Cathode Layer

The cathode layer according to the present embodiment will be described with reference to FIG. 2B. FIG. 2B is a view enlarging a part (region IIB) of a schematic sectional view of all-solid-state battery 100 shown in FIG. 2A. Cathode layer 10 according to the present embodiment includes cathode current collector 11 and cathode active material layer 13 containing at least cathode active material 12 and formed on cathode current collector 11. In addition, cathode active material layer 13 may contain a solid electrolyte for securing an ion conductivity, a conductive assistant for increasing an electron conductivity, and a binder for increasing adhesive strength.

B-1-1. Cathode Current Collector

Cathode current collector 11 performs current collection of cathode active material layer 13. As the material of cathode current collector 11, for example, a metal material such as aluminum, gold, platinum, zinc, copper, SUS, nickel, tin, titanium, or an alloy of two or more thereof, a carbon material, a conductive resin material or the like is used. Further, as the shape of cathode current collector 11, for example, a foil-like body, a plate-like body or the like can be mentioned.

The thickness of cathode current collector 11 may be appropriately selected depending on the application of the all-solid-state battery, and may be, for example, greater than or equal to 5 μm and less than or equal to 30 μm. This is because in a case where cathode current collector 11 is too thick, the energy density decreases, and in a case where cathode current collector 11 is too thin, the workability becomes poor.

The cathode current collector 11 according to the present embodiment includes the plurality of uneven portions 14 on the surface perpendicular to the stacking direction. Further, the rear surface (the surface facing the surface on the side adjacent to cathode active material layer 13) of cathode current collector 11 may have an arithmetic average roughness (Ra) of greater than or equal to 0.1 μm and less than or equal to 10 μm, and preferably greater than or equal to 0.5 m and less than or equal to 5 μm. In a case where the rear surface of cathode current collector 11 has a low value of the arithmetic average roughness (Ra), the rear surface of cathode current collector 11 becomes smooth, and thus it becomes difficult for cathode current collector 11 to directly join to anode current collector 21 of another adjacent all-solid-state battery at the time of manufacturing stacked all-solid-state battery 200. On the other hand, in a case where the rear surface of cathode current collector 11 has a high value of the arithmetic average roughness (Ra), variations in the pressure distribution at the time of pressing become large, and thus it becomes difficult to obtain stable battery performances (for example, charging and discharging characteristics).

The method of measuring the arithmetic average roughness (Ra) is not particularly specified, and it is measured, for example, by a contact type surface roughness meter, a non-contact type surface roughness meter such as a laser step meter, or the like.

Similarly to the rear surface of cathode current collector 11, the coating surface of cathode current collector 11 may have an arithmetic average roughness (Ra) of greater than or equal to 0.1 μm and less than or equal to 10 μm, and preferably greater than or equal to 0.5 μm and less than or equal to 5 μm. This is to increase the adhesive strength between cathode current collector 11, and cathode active material 12, solid electrolyte 31, the conductive assistant, the binder, and the like which are contained in cathode active material layer 13.

B-1-2. Cathode Active Material Layer

Next, cathode active material layer 13 according to the present embodiment will be described. Cathode active material layer 13 is a layer containing at least cathode active material 12 and formed on cathode current collector 11, and it may further contain at least one of solid electrolyte 31, a conductive assistant, and a binder, if necessary.

The thickness of cathode active material layer 13 varies depending on the type of the all-solid-state battery to be targeted, and may be, for example, in the range of 1 μm to 200 μm.

Hereinafter, constituent materials usable for cathode active material layer 13 will be described.

B-1-2-1. Cathode Active Material

Cathode active material 12 according to the present embodiment will be described. Cathode active material 12 refers to a substance in which lithium (Li) is inserted into or removed from its crystal structure at a potential higher than that of anode layer 20 and is oxidized or reduced accordingly. The type of cathode active material 12 is appropriately selected depending on the type of the all-solid-state battery, and examples thereof include an oxide active material and a sulfide active material.

For cathode active material 12 according to the present embodiment, for example, an oxide active material (lithium-containing transition metal oxide) is used. Examples of the oxide active material include $LiCoO_2$, $LiNiO_2$, $LiMn_2O_4$, $LiCoPO_4$, $LiNiPO_4$, $LiFePO_4$, $LiMnPO_4$, compounds obtained by substituting the transition metal of these compounds with one or two hetero elements, and the like. As the compounds obtained by substituting the transition metal of the above compounds with one or two hetero elements, known materials such as $LiNi_{1/3}Co_{1/3}Mn_{1/3}O_2$, $LiNi_{0.8}Co_{0.15}Al_{0.05}O_2$, and $LiNi_{0.5}Mn_{1.5}O_2$ are used. Cathode active material 12 may be used alone or in combination of two or more thereof.

Examples of the shape of cathode active material 12 include a particulate shape and a thin film shape. In a case where cathode active material 12 is in a particulate shape, an average particle diameter ($D_{50}$) is, for example, preferably in the range of greater than or equal to 1 μm and less than or equal to 100 μm, and among the range, the range of greater than or equal to 1 μm and less than or equal to 15 μm is preferred. This is because in a case where the average particle diameter of the cathode active material is too small, the handleability may be deteriorated, whereas in a case where its average particle diameter is too large, it may be difficult to obtain a flat cathode layer. The "average particle diameter" in the present specification means an average diameter on a volume basis measured by a laser analysis and a scattering-type particle size distribution measuring apparatus.

The surface of cathode active material 12 may be covered with a coat layer. This is because the reaction between cathode active material 12 (for example, an oxide active material) and solid electrolyte 31 (for example, a sulfide solid electrolyte) can be suppressed. As the material of the coat layer, for example, a Li ion conducting oxide such as $LiNbO_3$, $Li_3PO_4$ or LiPON can be mentioned. The average thickness of the coat layer is, for example, preferably in the range of greater than or equal to 1 nm and less than or equal to 20 nm, and more preferably in the range of greater than or equal to 1 nm and less than or equal to 10 nm.

B-1-2-2. Solid Electrolyte

The cathode layer 10 according to the present embodiment may include, for example, solid electrolyte 31, in addition to cathode active material 12. As a result, cathode active materials 12 can be adhered to each other, thereby allowing presence of many joining points or surfaces between cathode active materials 12 and securement of more ion conduction paths in cathode active material layer 13 than a case where solid electrolyte 31 is not contained. Therefore, in a case where solid electrolyte 31 is contained, it is possible to improve the ion conductivity of cathode active material layer 13, in addition to the electron conductivity thereof.

For the ratio of cathode active material 12 and solid electrolyte 31 contained in cathode active material layer 13, the ratio of cathode active material 12 to solid electrolyte 31 is preferably in the range of greater than or equal to 1 and less than or equal to 19, and more preferably in the range of greater than or equal to 70/30 and less than or equal to 19, as expressed in terms of weight. This is to secure both the lithium ion conduction path and the electron conduction path in cathode active material layer 13.

Solid electrolyte 31 may be appropriately selected depending on a conductive ion species (for example, lithium ion), and can be, for example, largely divided into a sulfide-based solid electrolyte and an oxide-based solid electrolyte.

The type of the sulfide-based solid electrolyte according to the present embodiment is not particularly limited, and examples thereof include $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$. In particular, Li (lithium), P (phosphorus) and S (sulfur) are preferably contained. This is because an excellent lithium ion conductivity is obtained. The sulfide-based solid electrolyte may be used alone or in combination of two or more thereof. In addition, the sulfide-based solid electrolyte may be crystalline, amorphous, or glass ceramics. The above description "$Li_2S$—$P_2S_2$" means a sulfide-based solid electrolyte formed using a raw material composition containing $Li_2S$ and $P_2S_5$, and the same applies to other descriptions.

In the present embodiment, one form of the sulfide-based solid electrolyte material is a sulfide glass ceramic containing $Li_2S$ and $P_2S_5$, and the ratio of $Li_2S$ and $P_2S_5$ as $Li_2S/P_2S_5$ is preferably in the range of greater than or equal to 70/30 and less than or equal to 4, and more preferably in the range of greater than or equal to 3 and less than or equal to 4, as expressed in terms of mol. This is to achieve a crystal structure with a high ion conductivity while maintaining the lithium concentration that affects the battery characteristics.

Examples of the shape of the sulfide-based solid electrolyte according to the present embodiment include a particulate shape such as a spherical shape and an ellipsoidal shape, and a thin film shape.

In a case where the sulfide-based solid electrolyte material is in a particulate shape, its average particle diameter ($D_{50}$) is not particularly limited, and it is preferably less than or equal to 40 μm, more preferably less than or equal to 20 μm, and even more preferably less than or equal to 10 μm. This is because it facilitates improvement of the filling rate in cathode layer 10. On the other hand, the average particle diameter is preferably greater than or equal to 0.01 μm, and more preferably greater than or equal to 0.1 μm. The average particle diameter can be determined by, for example, a particle size distribution meter.

Further, the oxide-based solid electrolyte according to the present embodiment will be described. The type of the oxide-based solid electrolyte is not particularly limited, and examples thereof include LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, and $Li_{1.5}Al_{0.5}Ge_{1.5}(PO_4)_3$. The oxide-based solid electrolyte may be used alone or in combination of two or more thereof.

B-1-2-3. Conductive Assistant

Cathode layer 10 according to the present embodiment may further contain, for example, a conductive assistant, in addition to cathode active material 12. The conductive assistant is not particularly limited as long as it improves the electron conductivity of cathode layer 10, and examples thereof include acetylene black, Ketjen black, and carbon fiber. The conductive assistant may be used alone or in combination of two or more thereof.

B-1-2-4. Binder

Cathode layer 10 according to the present embodiment may further contain, for example, a binder, in addition to cathode active material 12. This makes it possible to impart flexibility to cathode active material layer 13. The binder is not particularly limited, and examples thereof include a synthetic rubber such as butadiene rubber, isoprene rubber, styrene-butadiene rubber (SBR), styrene-butadiene-styrene (SBS), styrene-ethylene-butadiene-styrene (SEBS), ethylene-propylene, butyl rubber, chloroprene rubber, acrylonitrile-butadiene rubber, acrylic rubber, silicone rubber, fluororubber, or urethane rubber, polyvinylidene fluoride (PVDF), polyvinylidene fluoride-hexafluoropropylene copolymer (PVDF-HFP), polyimide, polyamide, polyamide imide, polyvinyl alcohol, and chlorinated polyethylene (CM). The binder may be used alone or in combination of two or more thereof.

B-2. Anode Layer

The anode layer according to the present embodiment will be described with reference to FIG. 2C. FIG. 2C is a view enlarging a part (region IIC) of a schematic sectional view of all-solid-state battery 100 shown in FIG. 2A.

Anode layer 20 according to the present embodiment has anode current collector 21 and anode active material layer 23 containing at least anode active material 22 and formed on anode current collector 21. The surface layer of anode current collector 21 according to the present embodiment has a plurality of uneven portions and has an arithmetic average roughness (Ra), which indicates the surface roughness of the rear surface of the current collector, of greater than or equal to 0.1 μm and less than or equal to 10 μm, and preferably greater than or equal to 0.5 μm and less than or equal to 5 μm. In a case where the roughness is low, it is difficult to directly join the current collectors to each other at the time of manufacturing the stacked all-solid-state battery, whereas in a case where the roughness is high, variations in the pressure distribution at the time of pressing becomes large and thus stable battery performances (for example, charging and discharging characteristics) cannot be obtained. Further, for anode layer 20, a solid electrolyte may be added to secure its ion conductivity, a conductive assistant to increase its electron conductivity, and a binder to increase its adhesive strength.

B-2-1. Anode Current Collector

Anode layer 20 according to the present embodiment includes anode current collector 21. Anode current collector 21 performs current collection of anode active material layer 23. As the material of anode current collector 21, for example, a metal material such as SUS, gold, platinum, zinc, copper, nickel, titanium, tin, or an alloy of two or more thereof, a carbon material, or a conductive resin material is used. Further, as the shape of anode current collector 21, for example, a foil-like body, a plate-like body, or the like can be mentioned.

The thickness of anode current collector 21 may be appropriately selected depending on the application of the all-solid-state battery, and may be, for example, greater than or equal to 5 μm and less than or equal to 30 μm. This is because in a case where anode current collector 21 is too thick, the energy density decreases and in a case where anode current collector 21 is too thin, the workability becomes poor.

Anode current collector 21 according to the present embodiment includes a plurality of uneven portions 24 on the surface perpendicular to the stacking direction. Further, the rear surface of anode current collector 21 (the surface which faces the surface on the side adjacent to anode active material layer 23) may have an arithmetic average roughness (Ra) of greater than or equal to 0.1 μm and less than or equal to 10 μm, and preferably greater than or equal to 0.5 μm and less than or equal to 5 μm. In a case where the rear surface of anode current collector 21 has a low value of the arithmetic average roughness (Ra), the rear surface of anode current collector 21 becomes smooth, and thus it becomes difficult for anode current collector 21 to directly join to cathode current collector 11 of another adjacent all-solid-state battery at the time of manufacturing stacked all-solid-state battery 200. On the other hand, in a case where the rear surface of anode current collector 21 has a high value of the arithmetic average roughness (Ra), variations in the pressure distribution at the time of pressing become large, and thus it becomes difficult to obtain stable battery performances (for example, charging and discharging characteristics).

The method of measuring the arithmetic average roughness (Ra) is the same as that of the cathode current collector, and thus the description therefor is omitted here.

Similarly to the rear surface of anode current collector 21, the coating surface of anode current collector 21 may have an arithmetic average roughness (Ra) of greater than or equal to 0.1 μm and less than or equal to 10 μm, and preferably greater than or equal to 0.5 μm and less than or equal to 5 μm. This is to increase the adhesive strength between anode current collector 21, and anode active material 22, solid electrolyte 31, the conductive assistant, the binder, and the like which are contained in anode active material layer 23.

B-2-2. Anode Active Material Layer

Next, anode active material layer 23 according to the present embodiment will be described. Anode active material layer 23 is a layer containing at least anode active material 22 and formed on anode current collector 21, and it may further contain at least one of solid electrolyte 31, a conductive assistant, and a binder, if necessary.

The thickness of anode active material layer 23 varies depending on the type of the all-solid-state battery to be targeted, and may be, for example, in the range of 1 m to 200 μm.

Hereinafter, constituent materials usable for anode active material layer 23 will be described.

B-2-2-1. Anode Active Material

Anode active material 22 according to the present embodiment will be described. Anode active material 22 refers to a substance in which lithium is inserted into or removed from its crystal structure at a potential lower than that of cathode layer 10, and is oxidized or reduced accordingly.

For anode active material 22 according to the present embodiment, for example, known materials are used, including a metal that is easily alloyed with lithium such as lithium, indium, tin, or silicon, a carbon material such as hard carbon or graphite, and an oxide active material such as $Li_4Ti_5O_{12}$ or $SiO_x$. Further, a complex obtained by appropriately mixing the above-described anode active materials 22, or the like can be used.

For the ratio of anode active material 22 and solid electrolyte 31 contained in anode active material layer 23, anode active material/solid electrolyte is preferably in the range of greater than or equal to 40/60 and less than or equal to 19, and more preferably in the range of greater than or equal to 1 and less than or equal to $85/15$, as expressed in terms of weight. This is to secure both the lithium ion conduction path and the electron conduction path in anode layer 20.

B-2-2-2. Solid Electrolyte

With regard to the solid electrolyte, the description therefor is omitted here in view of that described above in the section "B-1-2-2. Solid electrolyte".

For the ratio of anode active material 22 and solid electrolyte 31 contained in anode active material layer 23, anode active material/solid electrolyte is preferably in the range of greater than or equal to 40/60 and less than or equal to 19, and more preferably in the range of greater than or equal to 1 and less than or equal to $85/15$, as expressed in terms of weight. This is to secure both the lithium ion conduction path and the electron conduction path in anode layer 20.

B-2-2-3. Conductive Assistant

The conductive assistant is the same as that described above in the section "B-1-2-3. Conductive assistant", and thus the description therefor is omitted here.

B-2-2-4. Binder

The binder is the same as that described above in the section "B-1-2-4. Binder", and thus the description therefor is omitted here.

C. Other Configurations

In stacked all-solid-state battery 200 according to the present embodiment, although not shown, the rear surface of cathode current collector 11 of all-solid-state battery 100a at the end portion is attached to a terminal (metallic cathode lead) by welding, and the rear surface of anode current collector 21 of all-solid-state battery 100f at the end portion is attached to the terminal (metallic anode lead) by welding. Stacked all-solid-state battery 200 thus obtained may be configured such that it is housed in a battery case, the cathode lead and the anode lead are led to the outside of the battery case, and the battery case is sealed. In this case, as the battery case, for example, a bag made of an aluminum laminate film or the like, a case having any shape and made of metal (for example, SUS, iron, and aluminum) or resin, or the like is used.

D. Manufacturing Method

Hereinafter, a method of manufacturing stacked all-solid-state battery 200 according to the present embodiment, and a method of manufacturing all-solid-state battery 100, cathode layer 10, anode layer 20 and solid electrolyte layer 30 will be described.

D-1. Method of Manufacturing Stacked all-Solid-State Battery

Stacked all-solid-state battery 200 according to the present embodiment is manufactured by stacking a plurality of all-solid-state batteries 100 described above in the section "B. All-solid-state battery". There are provided a step of manufacturing all-solid-state battery 100 according to the present embodiment, a step of disposing a plurality of all-solid-state batteries 100a to 100f such that cathode current collector 11 of one all-solid-state battery 100b is joined to anode current collector 21 of the other all-solid-state battery 100a, with all-solid-state batteries 100a and 100b being adjacent to each other, and a step of pressing the disposed plurality of all-solid-state batteries 100a to 100f such that they are directly joined to each other.

Further, the pressing method is not particularly specified as long as the filling rate of each layer is adjustable to a desired range, and known pressing methods such as flat plate press, cold isostatic pressurization, hot isostatic pressurization, and roll press may be adopted. For example, in the case of roll press, the pressing pressure is preferably greater than or equal to 0.01 t/cm and less than or equal to 3 t/cm, and more preferably greater than or equal to 0.1 t/cm and less than or equal to 1 t/cm, in terms of linear pressure. This is because in a case where the pressing pressure is low, the joining strength at the interface is lowered and peeling occurs at the interface during charging and discharging, thereby resulting in a shortened cycle life. On the other hand, this is because in a case where the pressing pressure is high, interfacial voids are reduced, and thus the volume expansion of anode active material 22 cannot be absorbed, thereby resulting in a shortened cycle life.

In the stacking step according to the present embodiment, for example, the plurality of all-solid-state batteries 100a to 100f are disposed such that the rear surface of anode current collector 21 of all-solid-state battery 100a (the surface on the side facing the side on which anode active material layer 23 is disposed) is joined to the rear surface of cathode current collector 11 of all-solid-state battery 100b (the surface on the side facing the side on which cathode active material layer 13 is disposed), with two all-solid-state batteries 100a and 100b being adjacent to each other. Then, the plurality of all-solid-state batteries 100a to 100f are pressed such that they are interposed between a side at the rear surface (the surface on the side facing the side on which cathode active material layer 13 is disposed) of cathode current collector 11 of all-solid-state battery 100a and a side at the rear surface (the surface on the side facing the side on which anode active material layer 23 is disposed) of anode current collector 21 of all-solid-state battery 100f. Therefore, for example, as shown in FIG. 3A, stacked all-solid-state battery 200 is manufactured, in which the plurality of uneven portions 14 on the surface perpendicular to the stacking direction of cathode current collector 11 of all-solid-state battery 100b are at least partially engaged with the plurality of uneven portions 24 on the surface perpendicular to the stacking direction of anode current collector 21 of all-solid-state battery 100a.

As described above, the method of manufacturing stacked all-solid-state battery 200 according to the present embodiment includes a stacking step of stacking a plurality of all-solid-state batteries 100, each all-solid-state battery including cathode layer 10 that has cathode current collector 11 and cathode active material layer 13 containing at least cathode active material 12 and formed on cathode current collector 11, anode layer 20 that has anode current collector 21 and anode active material layer 23 containing at least anode active material 22 and formed on anode current collector 21, and solid electrolyte layer 30 disposed between cathode active material layer 13 and anode active material layer 23 and containing solid electrolyte 31 having at least a lithium ion conductivity. In the stacking step, for example, the plurality of all-solid-state batteries 100a to 100d are stacked such that cathode current collector 11 of one all-solid-state battery 100b is directly joined to anode current collector 21 of the other all-solid-state battery 100a, with two all-solid-state batteries 100a and 100b being adjacent to each other, and voids 40 are present at the interface between cathode current collector 11 of one all-solid-state battery 100b and anode current collector 21 of the other all-solid-state battery 100a.

According to the manufacturing method described above, since stacked all-solid-state battery 200 can be manufactured such that voids 40 are present at the interface between one all-solid-state battery 100b and the other all-solid-state battery 100a, voids 40 can absorb the expansion of anode active material 22 during charging. As a result, as shown in FIG. 3B, the contact area between cathode current collector 11 and anode current collector 21 at the interface increases, and thus peeling of all-solid-state batteries 100a and 100b at the interface can be suppressed. Further, the thermal conductivity between cathode current collector 11 and anode current collector 21 increases, thereby allowing heat generated in all-solid-state battery 100a to be efficiently radiated. Therefore, cycle life characteristics of stacked all-solid-state battery 200 can be further improved.

In addition, anode active material 22 contracts during discharging. Thus, the volume change of anode active material 22 also leads to a decreased volume of anode active material layer 23. As a result, as shown in FIG. 3C, voids 40 at the interface between cathode current collector 11 and anode current collector 21 increase. In a case where voids 40 increase, an air layer increases, and thus heat insulating properties of stacked all-solid-state battery 200 increases. Therefore, temperature lowering of stacked all-solid-state battery 200 can be suppressed in a low temperature environment at 0° C. or lower, or the like. Consequently, it is possible to improve battery characteristics (for example, charging and discharging characteristics) in a low temperature environment.

Further, presence of voids 40 at the interface between cathode current collector 11 of one all-solid-state battery 100b and anode current collector 21 of the other all-solid-state battery 100a results in an excellent releasability of all-solid-state batteries 100a and 100b at the interface, thereby allowing only a deteriorated all-solid-state battery (for example, all-solid-state battery 100a) to be removed from stacked all-solid-state battery 200. Therefore, it becomes possible to easily replace deteriorated all-solid-state battery 100a with new all-solid-state battery 100. As such, among the plurality of all-solid-state batteries 100a to 100f constituting stacked all-solid-state battery 200, replacement of deteriorated all-solid-state battery 100a with new all-solid-state battery 100 allows stacked all-solid-state battery 200 to be used for a longer time than a case where deteriorated all-solid-state battery 100a is not replaced with new all-solid-state battery 100.

D-2. Manufacture of all-Solid-State Battery

The method of manufacturing all-solid-state battery 100 according to the present embodiment includes, for example, a film forming step of producing cathode layer 10, anode layer 20, and solid electrolyte layer 30; a stacking step of stacking cathode layer 10, solid electrolyte layer 30, and anode layer 20, which have been obtained in the film forming step, in this order; and a pressing step of pressing cathode layer 10, solid electrolyte layer 30, and anode layer 20, which have been stacked to each other, such that the filling rate of each layer increases and the respective layers are joined to each other.

The film forming step will be described later in the section on the manufacturing method of each layer.

In the pressing step, cathode layer 10, anode layer 20, and solid electrolyte layer 30, which have been obtained in the film forming step, are configured such that solid electrolyte layer 30 is disposed between cathode layer 10 and anode layer 20, and then pressing is performed, for example, by a flat plate press, for example, at 400 MPa, from the respective outsides (the sides opposite to the side on which solid electrolyte layer 30 is disposed) of cathode layer 10 and anode layer 20 to obtain all-solid-state battery 100. The pressing step results in increased filling rate of cathode layer 10, anode layer 20, and solid electrolyte layer 30. Increased filling rate allows cathode layer 10 and anode layer 20 to have improved lithium ion conductivity and electron conductivity and allows solid electrolyte layer 30 to have improved lithium ion conductivity. As a result, good battery characteristics (for example, charging and discharging characteristics) are obtained.

The filling rate means the ratio of the volume of all substances which occupy an object to the apparent volume of the object. For example, the filling rate of cathode layer 10 means the ratio of the volume of all substances constituting cathode layer 10 to the apparent volume of cathode layer 10. In addition, the pressing pressure is not limited to 400 MPa, and the pressing pressure can be appropriately selected such that the filling rate of each layer is adjustable to a desired range. Further, the pressing method is not particularly specified as long as the filling rate of each layer is adjustable to a desired range, and known pressing methods such as cold isostatic pressurization, hot isostatic pressurization, and roll press may be adopted.

D-3. Producing Method of Cathode Layer

Cathode layer 10 is produced, for example, by a producing method (the film forming step as described above) which includes a coating step of coating the surface of cathode current collector 11 with a slurry, the slurry obtained by dispersing cathode active material 12, solid electrolyte 31, a binder and a conductive assistant in an organic solvent; a drying and baking step of heating and drying the prepared coating film to remove the organic solvent; and a pressing step of pressing the dried coating film formed on cathode current collector 11.

The coating method of the slurry is not particularly limited, and known coating methods such as a blade coater, a gravure coater, a dip coater, a reverse coater, a roll knife coater, a wire bar coater, a slot die coater, an air knife coater, a curtain coater, or an extrusion coater, or a combination thereof can be adopted.

Examples of the solvent may include a nonpolar solvent or a polar solvent, or a combination thereof can be mentioned. Examples of the nonpolar solvent may include heptane, xylene, or toluene, or a combination thereof. Examples of the polar solvent may include a tertiary amine-based solvent, an ether-based solvent, a thiol-based solvent or an ester-based solvent, or a combination thereof. The tertiary amine-based solvent may be, for example, triethylamine; the ether-based solvent may be, for example, cyclopentyl methyl ether; the thiol-based solvent may be, for example, ethane mercaptan; and the ester-based solvent may be, for example, butyl butyrate; or a combination thereof may be used.

The drying and baking step is not particularly limited, and may be performed, for example, at a temperature ranging from an ordinary temperature to 500° C., and a known drying and baking method may be adopted. The pressing step is not particularly limited, and known pressing methods such as a flat plate press, cold isostatic pressurization, hot isostatic pressurization, and roll press may be adopted.

D-4. Producing Method of Anode Layer

Anode layer 20 can be prepared in the same manner as cathode layer except that the materials used are changed to those for anode layer 20.

D-5. Producing Method of Solid Electrolyte Layer

Solid electrolyte layer 30 can be produced in the same manner as cathode layer 10, for example, except that solid electrolyte 31 and, if necessary, a binder are dispersed in an organic solvent to prepare a slurry and the resulting slurry is coated on a substrate, and a step of removing the substrate after the pressing step is used.

In a case where a slurry is coated on a substrate and dried to produce a solid electrolyte layer, the type of the organic solvent used for preparing the slurry is the same as that described above, and thus the description therefor is omitted here.

The organic solvent used for preparing the slurry is not particularly limited as long as it does not adversely affect the performance of solid electrolyte 31. Examples thereof include heptane, toluene, and hexane, which are hydrocarbon-based organic solvents, and a hydrocarbon-based organic solvent in which the moisture content is lowered by dehydration treatment is preferably used.

The substrate is not particularly limited as long as it can have solid electrolyte layer 30 formed thereon, and a film-like flexible substrate, a hard substrate or the like can be used. For example, a substrate such as Teflon (registered trademark) or polyethylene terephthalate (PET) film can be used. Alternatively, a slurry for solid electrolyte layer 30 may be directly coated on produced cathode layer 10 or anode layer 20.

It is noted that the present disclosure is not limited to the above embodiments. The above embodiments are illustrative, and in connection with the scope of the claims of the present disclosure, anything having substantially the same constitution as the technical idea and exhibiting the similar action and effect is included in the technical scope of the present disclosure.

EXAMPLES

Examples of the present embodiment will be described below. However, embodiments of the present disclosure are not limited to these examples. Unless otherwise specified, each example was carried out in a glove box or dry room of which dew point was controlled to be −45° C. or lower.

Preparation of Solid Electrolyte

First, a solid electrolyte $Li_2S$—$P_2S_5$ was prepared. $Li_2S$ and $P_2S$ were weighed such that $Li_2S:P_2S_5$ is 75:25 as expressed in terms of mol, pulverized using a mortar, and mixed. Next, a milling treatment was carried out for 10 hours with a planetary ball mill to obtain a solid electrolyte in a glass state. Then, the obtained solid electrolyte in a glass state was annealed in an inert gas atmosphere to obtain a solid electrolyte in a glass ceramics state. The annealing temperature was determined with reference to the temperatures of the crystallization peaks obtained by differential thermal analysis.

The measurement by an AC impedance method showed that the obtained solid electrolyte has the ion conductance of $7.0 \times 10^{-4}$ S/cm.

Example 1

$LiNi_{0.8}Co_{0.15}Al_{0.5}O_2$ (average particle diameter: 5 μm) as the cathode active material and the solid electrolyte $75Li_2S$-$25P_2S_5$ in a glass ceramics state were prepared and mixed in a mortar. The obtained powders were allowed to be film-formed a film on a previously-roughened aluminum foil and then pressed by a roll press under the conditions of a linear pressure of 0.2 t/cm, 25° C., and 0.1 m/min to produce a cathode layer.

Next, graphite as the anode active material and the above solid electrolyte $75Li_2S$-$25P_2S_5$ in a glass ceramics state were prepared and mixed in a mortar. The obtained powders were allowed to be film-formed on a previously-roughened copper foil and then pressed under the same conditions as the cathode layer to produce an anode layer.

The obtained cathode layer and anode layer were stacked such that the cathode current collector and the anode current collector were directly joined to each other to manufacture the all-solid-state battery of Example 1.

The cathode current collector (aluminum foil) and the anode current collector (copper foil) used were those which had been previously roughened and adjusted to have an arithmetic surface roughness (Ra) of 1.5 μm.

Example 2

An all-solid-state battery of Example 2 was manufactured in the same manner as in Example 1 except that a previously-roughened copper foil was used as the cathode current collector.

Comparative Example 1

An all-solid-state battery of Comparative Example 1 was manufactured in the same manner as in Example 1 except that the pressure at the time of pressing was changed to a linear pressure of 3.6 t/cm.

Comparative Example 2

An all-solid-state battery of Comparative Example 2 was manufactured in the same manner as in Example 2 except that the pressure at the time of pressing was changed to a linear pressure of 3.6 t/cm.

Comparative Example 3

An all-solid-state battery of Comparative Example 3 was manufactured in the same manner as in Comparative Example 1 except that a smooth aluminum foil was used as the cathode current collector.

Comparative Example 4

An all-solid-state battery of Comparative Example 4 was manufactured in the same manner as in Comparative Example 2 except that a smooth copper foil was used as the cathode current collector.

Manufacture of Stacked all-Solid-State Battery

Two all-solid-state batteries of Example 1 were stacked and pressed by a roll press under the conditions of a linear pressure of 0.2 t/cm, 25° C., and 0.1 m/min such that they are joined to each other, thereby manufacturing the stacked all-solid-state battery of Example 1.

The stacked all-solid-state batteries of Example 2 and Comparative Examples 1 to 4 were manufactured in the same manner.

Evaluation of Adhesive Strength

In the stacked all-solid-state batteries of Examples 1 and 2 and Comparative Examples 1 to 4, the adhesive strength between the cathode current collector and the anode current collector at each interface between the stacked plurality of all-solid-state batteries was evaluated. The adhesive strength was evaluated by wrapping a stacked all-solid-state battery around a rod of ϕ100 mm and visually observing the degree of cracks occurring at each interface between the plurality of all-solid-state batteries and the rate of the interfaces where cracks occurred. The results are shown in Table 1.

In Table 1, "A" indicates that there were no cracks at all interfaces in the stacked all-solid-state battery and a very strong adhesion was obtained; "B" indicates that sufficient adhesion was obtained; and "C" indicates that cracks occurred at all interfaces and no adhesion was obtained.

Evaluation of Releasability

In the stacked all-solid-state batteries obtained in Examples 1 and 2 and Comparative Examples 1 to 4, the releasability of the respective all-solid-state batteries at the interfaces between the stacked plurality of all-solid-state batteries was evaluated using a 90-degree peeling test. "A" indicates that peeling was possible, and "B" indicates that peeling was not possible. The results are shown in Table 1.

TABLE 1

| | Current collector | | Linear pressure | Evaluation | |
| | | | | Adhesive | Releas- |
| | Cathode | Anode | (t/cm) | strength | ability |
|---|---|---|---|---|---|
| Example 1 | Roughened Al | Roughened Cu | 0.2 | B | A |
| Example 2 | Roughened Cu | Roughened Cu | 0.2 | B | A |
| Comparative Example 1 | Roughened Al | Roughened Cu | 3.6 | A | B |
| Comparative Example 2 | Roughened Cu | Roughened Cu | 3.6 | A | B |
| Comparative Example 3 | Smooth Al | Smooth Cu | 3.6 | C | — |
| Comparative Example 4 | Smooth Cu | Smooth Cu | 3.6 | C | — |

Evaluation Result for Adhesive Strength

As shown in Table 1, in the stacked all-solid-state batteries of Examples 1 and 2 and Comparative Examples 1 and 2, the adhesive strength at each interface between the plurality of all-solid-state batteries was high. The surfaces of the cathode current collector and the anode current collector are a rough surface. Thus, it is considered that the adhesive strength was improved due to an anchor effect. On the other hand, in the stacked all-solid-state batteries of Comparative Examples 3 and 4, the adhesive strength in the plurality of all-solid-state batteries was low, and the joining could not be maintained. It is considered that this is because in a case where the surfaces of the cathode current collector and the anode current collector are smooth, an anchor effect hardly occurs at the time of joining.

Therefore, in a case where the surfaces of the cathode current collector and the anode current collector were a rough surface, it was found that an anchor effect occurred between the rough surfaces, and thus the adhesive strength at each interface between the plurality of all-solid-state batteries increased.

Evaluation Result for Releasability

As shown in Table 1, in the stacked all-solid-state batteries of Examples 1 and 2, individual all-solid-state batteries constituting the stacked all-solid-state battery could be removed smoothly from the stacked all-solid-state battery. As a result, in the stacked all-solid-state batteries of Examples 1 and 2, the releasability of the individual all-solid-state batteries at the interfaces was good. On the other hand, in the stacked all-solid-state batteries of Comparative Examples 1 and 2, the plurality of all-solid-state batteries constituting the stacked all-solid-state battery are strongly joined, and thus individual all-solid-state batteries could not be removed from the stacked all-solid-state battery. Therefore, in the stacked all-solid-state batteries of Comparative Examples 1 and 2, the releasability of the individual all-solid-state batteries at the interfaces was poor.

It is considered that this is because in the stacked all-solid-state batteries of Examples 1 and 2, the interfaces of the plurality of all-solid-state batteries were joined to each other by pressing at a relatively low pressure, such that there was a relatively large number of voids (which is the amount suitable to exert a desired releasability) at the interface. On the other hand, it is considered that this is because in the stacked all-solid-state batteries of Comparative Examples 1 and 2, the interfaces of the plurality of all-solid-state batteries are joined to each other by pressing at a relatively high pressure, such that the voids at the interface were reduced.

In Comparative Examples 3 and 4, the adhesive strength of the plurality of all-solid-state batteries was low, and thus the joining could not be maintained. Consequently, evaluation of releasability was not performed.

Discussion

Summarizing the above, in the stacked all-solid-state batteries of Examples 1 and 2, since the surfaces of the cathode current collector and the anode current collector were a rough surface and pressing was performed at a relatively low pressure, high adhesive strength and good releasability were obtained. In the stacked all-solid-state batteries of Comparative Examples 1 and 2, the surfaces of the cathode current collector and the anode current collector were a rough surface. However, since pressing was performed at a relatively high pressure, very high adhesive strength and poor releasability were obtained. In the stacked all-solid-state batteries of Comparative Examples 3 and 4, since the surfaces of the cathode current collector and the anode current collector were smooth, the adhesive strength of the plurality of all-solid-state batteries was low and the joining could not be maintained.

Therefore, in order to obtain a stacked all-solid-state battery having both desired joining strength and releasability, it was found that the surfaces of the cathode current collector and the anode current collector may be rough surfaces having an arithmetic average roughness (Ra) of greater than or equal to 0.1 μm and less than or equal to 10 μm and the pressure at the time of pressing may be a low pressure (for example, 0.2 t/cm). The materials and combinations of the current collectors are not particularly limited, and it is considered that in a case where the surface of the current collector is a rough surface, the above two effects can be obtained. Thus, the materials and combinations of the current collectors may be appropriately selected depending on the type of all-solid-state battery.

Summary

As described above, stacked all-solid-state battery 200 according to the above embodiment, includes a plurality of all-solid-state batteries 100, each all-solid-state battery 100 including cathode layer 10 that has cathode current collector 11 and cathode active material layer 13 containing at least cathode active material 12 and formed on cathode current collector 11, anode layer 20 that has anode current collector 21 and anode active material layer 23 containing at least anode active material 22 and formed on anode current collector 21, and solid electrolyte layer 30 disposed between cathode active material layer 13 and anode active material layer 23 and containing solid electrolyte 31 having at least a lithium ion conductivity. The plurality of all-solid-state batteries 100 are stacked, and the plurality of all-solid-state batteries 100a to 100f include two adjacent all-solid-state batteries (for example, all-solid-state batteries 100a and 100b), the two adjacent all-solid-state batteries being configured such that cathode current collector 11 of one all-solid-state battery 100b is directly joined to anode current collector 21 of the other all-solid-state battery 100a and voids 40 are present at the interface between cathode current collector 11 of one all-solid-state battery 100b and anode current collector 21 of the other all-solid-state battery 100a.

As a result, interfacial voids 40 absorb the expansion of anode active material 22 during charging, and thus peeling of all-solid-state batteries 100a and 100b at the interface can be suppressed. Further, the thermal conductivity between cathode current collector 11 and anode current collector 21 increases, thereby allowing heat generated in all-solid-state batteries 100a and 100b to be efficiently radiated. Therefore, cycle life characteristics of stacked all-solid-state battery 200 can be further improved. In addition, anode active material 22 contracts during discharging, and thus interfacial voids 40 increase, thereby increasing the heat insulating properties of stacked all-solid-state battery 200. Therefore, temperature lowering of stacked all-solid-state battery 200 can be suppressed in a low temperature environment at 0° C. or lower, or the like. Consequently, it is possible to improve battery characteristics (for example, charging and discharging characteristics) in a low temperature environment. Further, for the two adjacent all-solid-state batteries (for example, all-solid-state batteries 100a and 100b), presence of voids 40 at the interface between cathode current collector 11 of one all-solid-state battery 100b and anode current collector 21 of the other all-solid-state battery 100a results in an excellent releasability of all-solid-state batteries 100a and 100b at the interface, thereby allowing only a deteriorated all-solid-state battery (for example, all-solid-state battery 100a) to be removed from stacked all-solid-state battery 200. Therefore, it becomes possible to easily replace deteriorated all-solid-state battery 100a with new all-solid-state battery 100. As such, among the plurality of all-solid-state batteries 100a to 100f constituting stacked all-solid-state battery 200, replacement of deteriorated all-solid-state battery 100a with new all-solid-state battery 100 allows stacked all-solid-state battery 200 to be used for a longer time than a case where deteriorated all-solid-state battery 100a is not replaced with new all-solid-state battery 100.

In stacked all-solid-state battery 200 according to the above embodiment, cathode current collectors 11 and anode current collectors 21 of the plurality of all-solid-state batteries 100a to 100f include a plurality of uneven portions 14 and 24, respectively, on surfaces perpendicular to a stacking direction. The plurality of all-solid-state batteries 100a to 100f include two adjacent all-solid-state batteries (for example, all-solid-state batteries 100a and 100b), the two adjacent all-solid-state batteries being configured such that the plurality of uneven portions 14 of cathode current collector 11 of one all-solid-state battery 100b may be at least partially engaged with the plurality of uneven portions 24 of anode current collector 21 of the other all-solid-state battery 100a. As a result, cathode current collector 11 has the plurality of uneven portions 14 and anode current collector 21 has the plurality of uneven portions 24, thereby resulting in an increased contact area between cathode current collector 11 of one all-solid-state battery 100b and anode current collector 21 of the other all-solid-state battery 100a, with the two batteries being adjacent to each other in a stacking direction, and an improved electron conductivity at the interface. In addition, since the plurality of uneven portions 14 of cathode current collector 11 are at least partially engaged with the plurality of uneven portions 24 of anode current collector 21 that is joined to cathode current collector 11, an electrical connection between all-solid-state batteries 100a and 100b being adjacent to each other can be maintained without reduction.

In the stacked all-solid-state battery according to the present embodiment, the interfacial voids at the end portion in the stacking direction of the stacked all-solid-state battery may be smaller than the interfacial voids at the central portion in the stacking direction of the stacked all-solid-state battery. Therefore, by making the interfacial voids at the end portion in the stacking direction of stacked all-solid-state battery 200 less than the interfacial voids at the central portion in the stacking direction, the heat radiation properties at the interface between all-solid-state batteries 100c and 100d can be improved, and deterioration of all-solid-state batteries 100c and 100d due to heat can be suppressed.

In the stacked all-solid-state battery according to the present embodiment, the surface of the cathode current collector which faces the surface on the side adjacent to the cathode active material layer may have an arithmetic average roughness (Ra) of greater than or equal to 0.1 μm and less than or equal to 10 μm. Therefore, it is possible to directly join the two adjacent all-solid-state batteries (for example, all-solid-state batteries 100a and 100b) to each other while having an appropriate amount of voids 40 at the interface between two adjacent all-solid-state batteries 100a and 100b.

In the stacked all-solid-state battery according to the present embodiment, the surface of the anode current collector which faces the surface on the side adjacent to the anode active material layer may have an arithmetic average roughness (Ra) of greater than or equal to 0.1 μm and less than or equal to 10 μm. Therefore, it is possible to directly join the two adjacent all-solid-state batteries (for example, all-solid-state batteries 100a and 100b) to each other while having an appropriate amount of voids 40 at the interface between two adjacent all-solid-state batteries 100a and 100b.

The method of manufacturing the stacked all-solid-state battery according to the present embodiment includes: a preparing step of preparing a plurality of all-solid-state batteries 100, each all-solid-state battery 100 including a cathode layer that has a cathode current collector and a cathode active material layer containing at least a cathode active material and formed on the cathode current collector, an anode layer that has an anode current collector and an anode active material layer containing at least an anode active material and formed on the anode current collector, and a solid electrolyte layer disposed between the cathode active material layer and the anode active material layer and containing a solid electrolyte having at least a lithium ion conductivity; and a stacking step of stacking the plurality of all-solid-state batteries 100. In the stacking step, the plurality of all-solid-state batteries 100 are stacked such that the cathode current collector of one all-solid-state battery is directly joined to the anode current collector of the other all-solid-state battery and voids are present at the interface between the one all-solid-state battery and the other all-solid-state battery, with the two all-solid-state batteries being adjacent to each other and included in the plurality of all-solid-state batteries 100.

Thus, the interfacial voids of the current collector absorb the expansion of the anode active material during charging, and thus peeling of the all-solid-state batteries at the interface can be suppressed. Further, the thermal conductivity between cathode current collector 11 and anode current collector 21 increases, thereby allowing heat generated in all-solid-state battery 100 to be efficiently radiated. Therefore, cycle life characteristics of stacked all-solid-state battery 200 can be further improved. In addition, anode active material 22 contracts during discharging, and thus voids 40 increase, thereby increasing the heat insulating properties of stacked all-solid-state battery 200. Therefore, temperature lowering of stacked all-solid-state battery 200 can be suppressed in a low temperature environment at 0° C. or lower, or the like. Consequently, it is possible to improve battery characteristics (for example, charging and discharging characteristics) in a low temperature environment. Further, presence of voids 40 at at least one interface results in an excellent releasability of the all-solid-state batteries at the interface, thereby allowing only a deteriorated all-solid-state battery to be removed from stacked all-solid-state battery 200.

Hitherto, the all-solid-state battery according to the present disclosure has been described based on the embodiments and examples. However, the present disclosure is not limited to these embodiments and examples. It would be obvious to those skilled in the art that various modifications can be made to the embodiments and examples and other embodiments can be constructed by combining some constituent elements in the embodiments and the examples, without departing from the gist of the present disclosure, and such modifications and embodiments are intended to fall within the scope of the present disclosure.

The stacked all-solid-state battery according to the present disclosure is expected to be applied to a power source for a portable electronic device or the like and to an on-vehicle battery.

What is claimed is:

1. A stacked all-solid-state battery comprising:
    a plurality of all-solid-state batteries, each of the all-solid-state batteries including a cathode layer that has a cathode current collector and a cathode active material layer containing at least a cathode active material and formed on the cathode current collector, an anode layer that has an anode current collector and an anode active material layer containing at least an anode active material and formed on the anode current collector, and a solid electrolyte layer disposed between the cathode active material layer and the anode active material layer and containing a solid electrolyte having at least a lithium ion conductivity, wherein
    the plurality of all-solid-state batteries are stacked,
    the cathode current collectors and the anode current collectors of the plurality of all-solid-state batteries include a plurality of uneven portions, respectively, on surfaces perpendicular to a stacking direction of the plurality of all-solid-state batteries,
    the plurality of all-solid-state batteries include two adjacent all-solid-state batteries, the two adjacent all-solid-state batteries being configured such that the cathode current collector of one of the two adjacent all-solid-state batteries is directly joined to the anode current collector of an other one of the two adjacent all-solid-state batteries,
    a void is present at an interface between the cathode current collector of the one of the two adjacent all-solid-state batteries and the anode current collector of the other one of the two adjacent all-solid-state batteries,
    the plurality of uneven portions of the cathode current collector of the one of the two adjacent all-solid-state batteries are at least partially engaged with the plurality of uneven portions of the anode current collector of the other one of the two adjacent all-solid-state batteries, and
    an interfacial void at an end portion of the stacked all-solid-state battery in the stacking direction is smaller than an interfacial void at a central portion of the stacked all-solid-state battery in the stacking direction.

2. The stacked all-solid-state battery of claim 1,
    wherein a surface of the cathode current collector of the one of the two adjacent all-solid-state batteries has an arithmetic average roughness of greater than or equal to 0.1 μm and less than or equal to 10 μm, the surface opposing another surface of the cathode current collector of the one of the two adjacent all-solid-state batteries, the another surface being adjacent to the cathode active material layer of the one of the two adjacent all-solid-state batteries.

3. The stacked all-solid-state battery of claim 1,
    wherein a surface of the anode current collector of the other one of the two adjacent all-solid-state batteries has an arithmetic average roughness of greater than or equal to 0.1 μm and less than or equal to 10 μm, the surface opposing another surface of the anode current collector of the other one of the two adjacent all-solid-state batteries, the another surface being adjacent to the anode active material layer of the other one of the two adjacent all-solid-state batteries.

4. A method of manufacturing a stacked all-solid-state battery, the method comprising:
    preparing a plurality of all-solid-state batteries, each of the all-solid-state batteries including a cathode layer that has a cathode current collector and a cathode active material layer containing at least a cathode active material and formed on the cathode current collector, an anode layer that has an anode current collector and an anode active material layer containing at least an anode active material and formed on the anode current collector, and a solid electrolyte layer disposed between the cathode active material layer and the anode active material layer and containing a solid electrolyte having at least a lithium ion conductivity; and stacking the plurality of all-solid-state batteries, wherein the cathode current collectors and the anode current collectors of the plurality of all-solid-state batteries include a plurality of uneven portions, respectively, on surfaces perpendicular to a stacking direction of the plurality of all-solid-state batteries, wherein the plurality of all-solid-state batteries includes two adjacent all-solid-state batteries, wherein in the stacking, the plurality of all-solid-state batteries are stacked such that the cathode current collector of one of the two adjacent all-solid-state batteries is directly joined to the anode current collector of an other one of the two adjacent all-solid-state batteries, wherein a void is present at an interface between the cathode current collector of the one of the two adjacent all-solid-state batteries and the anode current collector of the other one of the two adjacent all-solid-state batteries, wherein the plurality of uneven portions of the cathode current collector of the one of the two adjacent all-solid-state batteries are at least partially engaged with the plurality of uneven portions of the anode current collector of the other one of the two adjacent all-solid-state batteries, and wherein an interfacial void at an end portion of the stacked all-solid-state battery in the stacking direction is smaller than an interfacial void at a central portion of the stacked all-solid-state battery in the stacking direction.

* * * * *